United States Patent
Kote et al.

(10) Patent No.: US 9,221,428 B2
(45) Date of Patent: Dec. 29, 2015

(54) DRIVER IDENTIFICATION SYSTEM AND METHODS

(75) Inventors: Thejovardhana S. Kote, Berkeley, CA (US); Jerald Jariyasunant, San Francisco, CA (US)

(73) Assignee: Automatic Labs Inc., San Francisco, CA (US)

( * ) Notice: Subject to any disclaimer, the term of this patent is extended or adjusted under 35 U.S.C. 154(b) by 0 days.

(21) Appl. No.: 13/403,323

(22) Filed: Feb. 23, 2012

(65) Prior Publication Data

US 2012/0226421 A1 Sep. 6, 2012

Related U.S. Application Data

(60) Provisional application No. 61/448,383, filed on Mar. 2, 2011.

(51) Int. Cl.
*G05D 1/00* (2006.01)
*G05D 3/00* (2006.01)
*G06F 7/00* (2006.01)
(Continued)

(52) U.S. Cl.
CPC .......... B60R 25/20 (2013.01); *B60W 2540/28* (2013.01); *G06Q 40/08* (2013.01); *G06Q 50/30* (2013.01); *G07C 5/08* (2013.01); *G07C 5/0816* (2013.01)

(58) Field of Classification Search
CPC .......... B60R 25/20; G07C 5/08; G07C 5/09; G07C 5/10; G07C 5/0816; G06Q 40/08; G06Q 50/30; B60W 2540/28
USPC .......... 701/1, 29, 33, 49, 51, 29.6, 31.4, 400, 701/45; 340/439, 426.14, 5.83, 572.1, 576, 340/901, 933, 988, 990, 942, 541, 5.64, 340/5.33, 426.13; 455/426.1, 5.8, 5.81, 455/345, 404.2, 414.1, 456.1; 705/4.63, 705/36 R, 37, 4, 5, 500, 80
See application file for complete search history.

(56) References Cited

U.S. PATENT DOCUMENTS 4,660,140 A * 4/1987 Illg ................................. 700/79
4,707,788 A * 11/1987 Tashiro et al. ................ 701/49
(Continued)

FOREIGN PATENT DOCUMENTS

| JP | 2009-169486 A | 7/2009 |
|---|---|---|
| KR | 10-2010-0024715 A | 3/2010 |
| WO | WO 2011004372 A1 * | 1/2011 |

OTHER PUBLICATIONS

Wahab, "Driving Profile Modeling and Recognition Based on Soft Computing Approach", Apr. 2009, IEEE.*

*Primary Examiner* — Khoi Tran
*Assistant Examiner* — Rachid Bendidi
(74) *Attorney, Agent, or Firm* — Donal K. Boys; Central Coast Patent Agency, Inc.

(57) ABSTRACT

A system for developing a digital signature identifying a specific person operating a vehicle uses a computerized appliance and software or firmware executing from a non-transitory medium on the computerized appliance and providing a first function collecting raw data regarding vehicle operation from sensors implemented in the vehicle during operation by the specific person, a second function analyzing the raw data and identifying at least one pattern of behavior associated with the specific person; and a third function developing a digital signature from the analyzed data for that specific person.

14 Claims, 4 Drawing Sheets

(51) Int. Cl.
*G06F 17/00* (2006.01)
*B60R 25/20* (2013.01)
*G06Q 40/08* (2012.01)
*G06Q 50/30* (2012.01)
*G07C 5/08* (2006.01)

(56) References Cited

U.S. PATENT DOCUMENTS

| | | | |
|---|---|---|---|
| 6,198,996 B1 * | 3/2001 | Berstis | 701/36 |
| 6,205,374 B1 * | 3/2001 | Kljima et al. | 701/1 |
| 6,230,084 B1 * | 5/2001 | Kijima et al. | 701/1 |
| 6,438,472 B1 * | 8/2002 | Tano et al. | 701/29.6 |
| 6,490,513 B1 * | 12/2002 | Fish et al. | 701/32.6 |
| 6,505,780 B1 * | 1/2003 | Yassin et al. | 235/492 |
| 7,085,632 B2 * | 8/2006 | Nakaya | 701/49 |
| 7,243,945 B2 * | 7/2007 | Breed et al. | 280/735 |
| 7,406,603 B1 * | 7/2008 | MacKay et al. | 713/193 |
| 7,407,029 B2 * | 8/2008 | Breed et al. | 180/274 |
| 7,415,126 B2 * | 8/2008 | Breed et al. | 382/100 |
| 7,417,396 B2 * | 8/2008 | Yoshida et al. | 318/466 |
| 7,535,344 B2 * | 5/2009 | Obradovich | 340/426.33 |
| 7,663,502 B2 * | 2/2010 | Breed | 340/12.25 |
| 7,714,742 B1 * | 5/2010 | Noworolski et al. | 340/932.2 |
| 7,715,961 B1 * | 5/2010 | Kargupta | 701/29.3 |
| 7,770,031 B2 * | 8/2010 | MacKay et al. | 713/193 |
| 7,979,177 B2 * | 7/2011 | Hermann et al. | 701/29.6 |
| 2004/0158373 A1 * | 8/2004 | Nakaya | 701/35 |
| 2004/0236596 A1 * | 11/2004 | Chowdhary et al. | 705/1 |
| 2005/0131597 A1 | 6/2005 | Raz et al. | |
| 2006/0212195 A1 * | 9/2006 | Veith et al. | 701/35 |
| 2008/0269979 A1 * | 10/2008 | Hermann et al. | 701/33 |
| 2009/0240427 A1 * | 9/2009 | Siereveld et al. | 701/201 |
| 2010/0087987 A1 * | 4/2010 | Huang et al. | 701/36 |
| 2010/0228447 A1 * | 9/2010 | Serban et al. | 701/49 |
| 2011/0012720 A1 * | 1/2011 | Hirschfeld | 340/439 |
| 2011/0106375 A1 * | 5/2011 | Gurusamy Sundaram | 701/33 |
| 2011/0251734 A1 * | 10/2011 | Schepp et al. | 701/1 |
| 2012/0109418 A1 * | 5/2012 | Lorber | 701/1 |
| 2013/0084847 A1 * | 4/2013 | Tibbitts et al. | 455/419 |
| 2013/0085652 A1 * | 4/2013 | McGuffin | 701/101 |

* cited by examiner

DRIVER IDENTIFICATION SYSTEM AND METHODS

CROSS-REFERENCE TO RELATED DOCUMENTS

The present invention claims priority to a U.S. provisional patent application No. 61/448,383 entitled "Driving Behavior Digital Signature to Identify Vehicle Driver", filed on Mar. 2, 2011, disclosure of which is incorporated herein at least by reference.

BACKGROUND OF THE INVENTION

1. Field of the Invention

The present invention is in the field of telematics and pertains particularly to methods and apparatus for determining and managing driver identities relative to vehicle operation through a process of telematics.

2. Discussion of the State of the Art

In the field of telematics, data is collected about vehicle usage and driver behavior while the driver is operating a vehicle in the field. An insurance company or other authorized agent may receive and analyze data collected through telematics. Actual data about vehicle operation, driving conditions, and behavioral data about the driver enable the company to get a more accurate picture of driving behavior for risk determination, for example, which is critical in setting appropriate rates for insuring drivers accordingly.

Current data collection systems often require a hardware device to be installed within a targeted vehicle. The hardware may transmit data over data networks like cellular phone networks. One potential drawback of this technique is that hardware and network charges to implement this solution are expensive. Moreover, the approach is not flexible relative to the consumer input or direction of the process. Privacy concerns among consumers have arisen in response to these in-vehicle hardware solutions.

The present inventor is aware of a system for analyzing sensor data output from a mobile communications appliance to adjust insurance premiums for consumers. The system includes an Internet-connected server; and software executing on the server from a non-transitory physical medium, the software providing a first function for collecting raw data from the mobile communications appliance, a second function for analyzing the raw data in light of results of previous data analyses, and a third function for adjusting a standing insurance premium rate associated with the mobile communications appliance. It has occurred to the inventors, that in many cases of vehicle operation or ownership, there may be more than one authorized driver that might share overall use or utility of the vehicle. In such circumstances, it may be important to be able to easily identify an authorized driver and to tell that driver apart from another authorized driver and from any unauthorized drivers that might gain access to and operate the vehicle.

Therefore, what is clearly needed in the art is a system for developing an identification signature for a vehicle operator authorized to access and operate a certain vehicle based on data collected while the operator operated the vehicle.

SUMMARY OF THE INVENTION

The problem stated above is that the ability to identify vehicle operators during operation of a vehicle is desirable for a company that has a fleet of vehicles typically driven by more than one or by many different operators such as a vehicle rental operation or a trucking company, but many of the conventional means for determining driver identification such as by schedule, punch key, or voluntary communication are not secure and may be worked around in the field. The inventors therefore considered functional components of a user verification system, looking for elements that exhibit interoperability that could potentially be harnessed in real time to provide identification of a vehicle operator based on current operator behaviors in a manner that would also reduce risk of security breach.

Most user verification systems rely on accurate identification of the user based on irrefutable security data provided by the user such as with a pass code or a passkey. Byproducts of such security regimens are forgotten pass codes or compromised passkey operations at the time the verification attempt is made to identify a vehicle operator. Most such user verification systems employ servers executing software to maintain communication with the user being verified, and network servers and software applications are typically a part of such apparatus.

The present inventor realized in an inventive moment that if, during operation of a vehicle, the vehicle operator could be accurately and securely identified in near-to-real time and could be associated directly with operation of the vehicle, better security and more reliable information for insurance, law enforcement, product shipping, or other services might result. The inventor therefore constructed a unique real-time data collection and analysis system and service for in-field vehicle operators that allowed fleet operators, public or private security agencies, and other entities to validate or invalidate authorization for operating a vehicle based on near-to-real-time comparison of driver vehicle operation data and other known data with a digital identification signature of one or more vehicle operators that are granted authorization to operate the vehicle. A significant reduction in security risks results, with no impediment to the overall validation process created.

Accordingly, in one embodiment, a system is provided for developing a digital signature identifying a specific person operating a vehicle, comprising a computerized appliance and software or firmware executing from a non-transitory medium on the computerized appliance. The software or firmware provides a first function collecting raw data regarding vehicle operation from sensors implemented in the vehicle during operation by the specific person, a second function analyzing the raw data and identifying at least one pattern of behavior associated with the specific person, and a third function developing a digital signature from the analyzed data for that specific person.

In one embodiment of the system the computerized appliance communicates with a network-connected server, communicates data to the server, and the server provides at least a part of the development of the digital signature. Also in one embodiment the raw data comprises acceleration, deceleration, continued average speed, centrifugal force, braking patters, gearshift manipulation patterns, and frequency of lane changes. Still in one embodiment the raw data includes global positioning service (GPS) data coordinates, time reference for vehicle operation, route data associated with vehicle operation, and data about adjustable seating position and mirror alignment position during vehicle operation. The raw data in some embodiments may include weather conditions, vehicle and operator combined weight, and traffic conditions during vehicle operation.

In the system incorporating a network-connected server a specific person may be designated to the server by the vehicle operator communicating directly to the server. In some embodiments the computerized appliance may be one of a cellular telephone, an iPad, a personal digital assistant (PDA), an in-dash telephone, or a notebook computer enhanced for telephony. In other embodiments the computerized appliance may be a wireless modem-assisted reporting module having electronic access to car diagnostics systems through a fixed engine control unit (ECU).

In various embodiments the digital signature developed for the specific person is stored and used for comparison to identify that person as vehicle operator in future vehicle operation sessions. In some cases there may be more than one specific person associated with a single vehicle, and digital signatures may be developed for more than one specific person associated with a single vehicle, the digital signatures used during vehicle operation to identify which one of multiple persons associated with the single vehicle operators is currently operating the vehicle.

In another aspect of the invention a method for developing a digital signature identifying a specific person operating a vehicle is provided, comprising the steps of (a) collecting, by a computerized appliance from sensors implemented in the vehicle, and during operation by the specific person, raw data regarding vehicle operation; (b) analyzing the raw data and identifying at least one pattern of behavior associated with the specific person; and (c) developing a digital signature from the analyzed data for that specific person.

In one embodiment of the method the computerized appliance communicates with a network-connected server, communicates data to the server, and the server provides at least a part of the development of the digital signature. Also in one embodiment the raw data comprises acceleration, deceleration, continued average speed, centrifugal force, braking patterns, gearshift manipulation patterns, and frequency of lane changes. Still in one embodiment the raw data includes global positioning service (GPS) data coordinates, time reference for vehicle operation, route data associated with vehicle operation, and data about adjustable seating position and mirror alignment position during vehicle operation. The raw data in some embodiments may include weather conditions, vehicle and operator combined weight, and traffic conditions during vehicle operation.

In the method incorporating a network-connected server a specific person may be designated to the server by the vehicle operator communicating directly to the server. In some embodiments the computerized appliance may be one of a cellular telephone, an iPad, a personal digital assistant (PDA), an in-dash telephone, or a notebook computer enhanced for telephony. In other embodiments the computerized appliance may be a wireless modem-assisted reporting module having electronic access to car diagnostics systems through a fixed engine control unit (ECU).

In various embodiments the digital signature developed for the specific person is stored and used for comparison to identify that person as vehicle operator in future vehicle operation sessions. In some cases there may be more than one specific person associated with a single vehicle, and digital signatures may be developed for more than one specific person associated with a single vehicle, the digital signatures used during vehicle operation to identify which one of multiple persons associated with the single vehicle operators is currently operating the vehicle.

BRIEF DESCRIPTION OF THE DRAWING FIGURES

DETAILED DESCRIPTION

The inventors provide a unique telematics system and methods that enable service operators dealing in vehicle rentals, trucking, transportation, law enforcement, and insurance provisioning to, in near-to-real time, to positively identify vehicle operators with the ability to tell authorized operators from other authorized operators and from non-authorized vehicle operators. The present invention will be described in enabling detail using the following examples, which may describe more than one relevant embodiment falling within the scope of the present invention.

Figure 1:
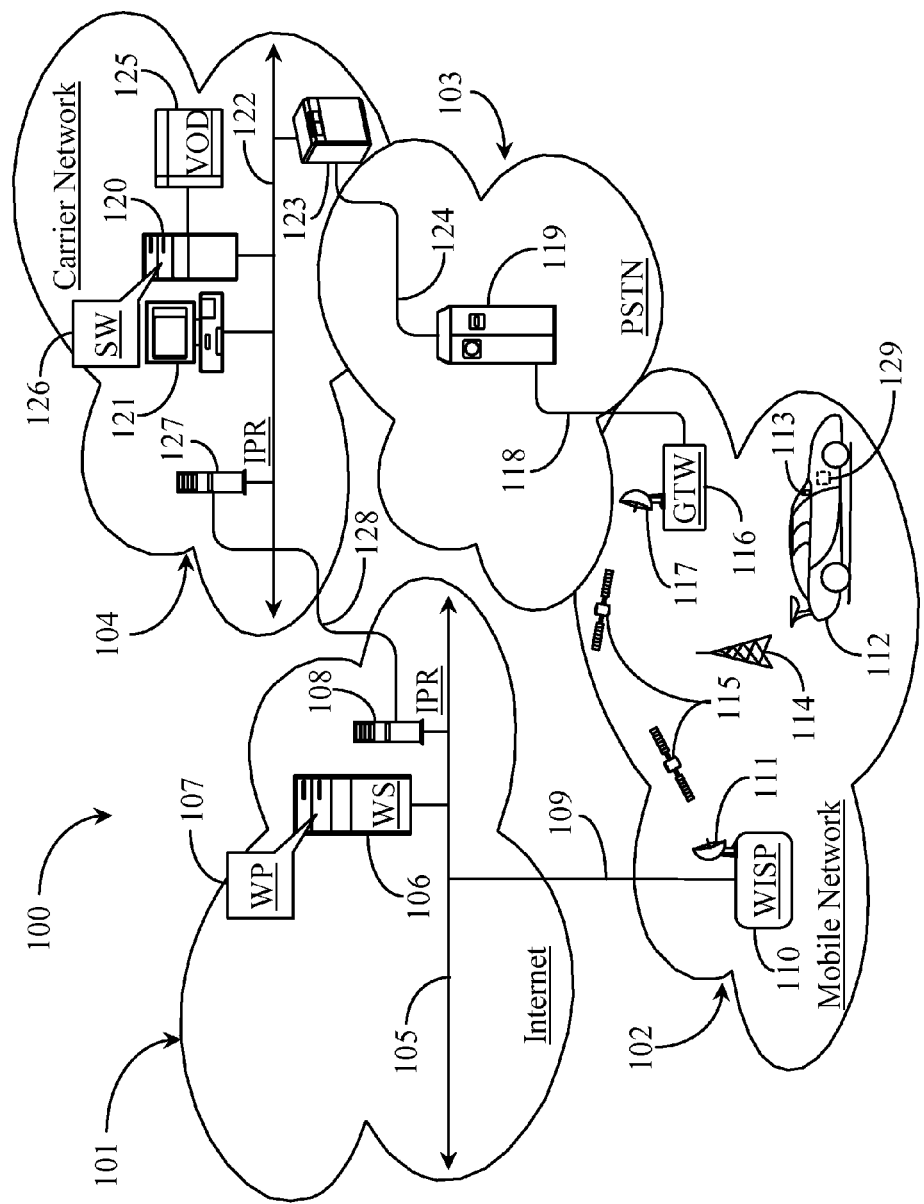
FIG. 1 is an architectural overview of a communications network supporting telematics according to an embodiment of the present invention.

FIG. 1 is an architectural overview 100 of a communications network supporting telematics according to an embodiment of the present invention. Communications network 100 includes the Internet network 101. Internet network 101 is also represented in this example by an Internet network backbone 105. Network backbone 105 includes all of the lines, equipment, and access points that make up the Internet as a whole, including any connected sub-networks. Therefore, there are no geographic limitations to the practice of the present invention.

Internet backbone 105 supports a web server (WS) 106. WS 106 includes a non-transitory physical medium that contains all of the software and data required to enable server function as a web page server. A third-party web hosting service company may maintain WS 106. In one embodiment, the service-providing company of the service of the present invention maintains WS 106. WS 106 contains a web page (WP) 107. WP 107 may serve as a consumer access point for registering to participate in the telematics service of the present invention. WS 107 may serve as a notification page to users or consumers of the present invention. WP 107 may include various interfaces for consumer interaction with the providing company. One such interface may be provided through WP 107 for registering users for the telematics service of the present invention.

It is noted herein that WP 107 may include content type that is highly dependant on the type of entity that is performing identification of vehicle operators that are operating specified vehicles. More specifically, the present invention relates to identification verification of vehicle operators for any industry, law enforcement agency, insurance agency, government agency, employer, cab company, or any other entity that might have a business interest in validating the identification of one or more authorized vehicle operators for specified vehicles. Further, there may be variations in the level of functionality that is implemented at a server as opposed to a client-based communications appliance. For client appliances that are not robust more functionality might be provided on the server side. On the other hand in many embodiments a great deal of functionality may be provided on the client's communications appliance.

Communications network 100 includes a service network 104. Service network 104 is also represented in this example by a local area network (LAN) backbone 122. LAN 122 is hosted by the service providing company such as an insurance company, trucking company, law enforcement agency, or any entity that deals with a fleet of vehicles weather those vehicles are corporate, public, or private vehicles. LAN 122 may be a corporate wide area network (WAN) instead of a LAN without departing from the spirit and scope of the present invention. It is noted herein that the described networks may include both wireless and wired access points without parting from the spirit and scope of the present invention.

LAN 122 has connectivity to Internet backbone 105 via an Internet protocol router (IPR) 127. IPR 127 includes a non-transitory physical medium that contains all of the software and data required to enable routing of network data between external networks. IPR 127 is connected to an IPR 108 supported by Internet backbone 105 by way of an Internet access line 128. IPR 108 includes a non-transitory physical medium that contains all of the software and data required to enable routing of network data between external networks.

LAN 122 supports a telematics server 120. Telematics server 120 includes a non-transitory physical medium that contains all of the software and data required to enable telematics service related to vehicle operation monitoring and reporting for data analysis purposes. Server 120 may be linked to WP 107 for redirect to users who successfully register themselves or any other users for the telematics service of the present invention. In other cases, the exact mechanism of client participation may vary. For example, all truck drivers that may be asked to drive a specific company-owned vehicle and may be required to participate. In another example, an insurance company may require all proposed insured family members who drive a private insured vehicle to participate.

Server 120 hosts software (SW) 126 to practice the telematics service. SW 126 resides on and is executable from a non-transitory physical medium internal to or otherwise coupled to server 120. SW 126 performs a first function for collecting raw data including raw data about vehicle operation from the communications appliance, the raw data associated with a pre-designated vehicle operator. SW 126 performs a second function, a second function for analyzing the raw data and identifying at least one pattern of and or sequence of events that have high repeatability characteristics that might, with or without combination with other known or collected data, characterize one or more vehicle-operation styles that are proven unique to that vehicle operator. SW 126 performs a third function for developing a digital signature from the analyzed data for that vehicle operator.

Server 120 is, in this embodiment, an Internet-connected server by virtue of connectivity to Internet backbone 105 through IPR 127, Internet access line 128, and IPR 108. Internet connectivity for server 120 is constant in a preferred embodiment. However, that preference should not be construed as a limitation to practice of the present invention. In other embodiments, server 120 may be periodically connected to the Internet for pre-specified periods without departing from the spirit and scope of the present invention. Server 120 has connection to a mass data repository 125 that serves as a vehicle operator database (VOD). VOD 125 may be an optical storage facility, a magnetic storage facility, a redundant array of integrated disks (RAID), or any other form of data storage facility. VOD 125 includes operator identification information, operator contact information, vehicle operation data in the form of developed vehicle operation signatures, and other forms of data deemed appropriate based on the service provider model of managing identifications of vehicle operators that might share a vehicle in service, in business, or in private scenarios like insurance, for example.

LAN 122 supports an administrator workstation 121. Workstation 121 serves as a LAN-connected computing station that enables an administrator to interact with the telematics service of the present invention. Administration station 121 has access to server 120 and an authorized administrator may log-into server 120 to review records, obtain data useful in planning, underwriting, and so on. In one embodiment of the invention, an administrator or knowledge worker may physically monitor any ongoing data collection and analysis sequence for any registered user and review, make notes, initiate communication, report a problem, and so on.

LAN 122 supports a telephony server 123. Telephony server 123 includes a non-transitory physical medium that contains all of the software and data required to enable telephony services such as human and/or machine operated outbound voice calling and human and/or machine data calling including digital messaging service capabilities. Telephony server 123 may used by the telematics service to initiate contact with vehicle operators whom are operating vehicles in the field that are targets of the vehicle operator identification service. Initiating voice telephony with a vehicle operator is not required in order to practice the invention. The telephony architecture in this example is optional and may serve as a simple notification service to notify vehicle operators of confirmed authenticity for operating a specific vehicle or notification of non-authorized vehicle operation due to failed identification of the operator.

The inventor recognizes that calling a vehicle operator via a cellular device while the operator may be operating a vehicle is not necessarily a good idea, but it is recognized as well that communication with the operator may be necessary in some cases. In some cases such outgoing messaging from the server side may be restricted to text messaging. Another alternative is that client devices may be configured so a call from the server side will trigger the client appliance to go directly to voice mail for the caller ID without ring tone. There are other possibilities to be sure an unsafe situation is not created.

In a preferred embodiment, a vehicle operator is identified through a digital signature derived from driving behavior undertaken by the operator. A fact that the vehicle operator may have a communications appliance that may identify the operator or even a pass card or card key is not conclusive evidence that the carrier of the communications appliance or key is actually the owner of same who is operating the vehicle. For example, the owner of a communications appliance from which sensor data is taken from might be a passenger or someone not in or near the vehicle at all. However, using a combination of data from a mobile communications appliance connected to the network and or from a vehicle-integrated communications appliance connected to the network in combination with data that is not necessarily linked to active driving might provide better evidence of who may actually be operating the vehicle at any given period.

Communications network 100 includes a public switched telephone network (PSTN) 103. PSTN 103 represents a local segment of the PSTN network. PSTN 103 includes a local telephony switch 119. Switch 119 may be a service control switch, an automated call distributor, or a private branch exchange switch without departing for the spirit and scope of the present invention. Switch 119 is connected via a telephone trunk 124 to telephony server 123 in service network 104. Switch 119 is connected to a wireless network gateway (GTW) 116 deployed in a mobile wireless network 102, referred to hereinafter as mobile network 102. Mobile network 102 represents any wireless carrier network that provides telephony and Internet access services to consumers.

Mobile network 102 may be integrated with other mobile networks operated by other wireless service providers to expand network coverage for mobile communications appliances such as cellular telephones and the like.

Mobile network 102 offers Internet connectivity through a wireless Internet service provider (WISP) 110. WISP 110 has connection to Internet backbone 105 via an Internet access line 109. A vehicle operator operating a vehicle 112 may have a mobile communications appliance 113 powered on for Internet access and communication. Mobile communications appliance 113 may or may not be stationed or docked in a hands free operating receptacle or docking station that may be original equipment or an accessory integrated into the vehicle electronics system. Mobile communications appliance 113 may be a cellular telephone, a smart phone, an android device, a laptop or notebook computer, an iPAD™, or any other appliance that is enabled for telephony and Internet access and navigation. In one embodiment, the mobile communications appliance is a hand-held navigation unit adapted for telephony function and Internet access.

In a preferred embodiment, mobile appliance 113 includes a global positioning system (GPS) capability for reporting location. Mobile communications appliance 113 includes at least one sensor for sensing motion such as an accelerometer for measuring acceleration, deceleration, and sustained or continued average speed. In one embodiment, the mobile appliance further includes a proximity sensor for measuring distance between the mobile communications appliance and nearby objects. In one embodiment, the accelerometer may be enhanced to provide information relative to orientation, vibration, and shock. In one embodiment the accelerometer is a micro-electro-mechanical-system (MEMS) accelerometer capable of measuring acceleration, deceleration, sustained speed, pitch, yaw, shock, orientation, and vibration. Mobile appliance 113 may also include a light sensor for measuring ambient light or a magnetometer for measuring magnetic fields.

In one implementation of the present invention, an operator of vehicle 112 may have mobile communications appliance 113 powered on and connected to the Internet during the collection of raw sensor data from the appliance. But Internet connection is not strictly necessary. In one embodiment the client appliance will collect data and store it, and transfer that data to the server side on an intermittent basis. In one embodiment data from a mobile communications appliance like appliance 113 is collected along with data from a hardwired appliance like an engine control unit (ECU) 129 or other integrated vehicle computer (129) that may collect data from a plurality of sensors distributed throughout the vehicle.

In one example of the connection process, mobile communications appliance 113 and or appliance 129 is connected to WISP 110 and has been redirected from WS 106 off of WP 107 to server 120 running SW 126. SW 126 continuously or periodically monitors the sensor data from mobile appliance 113 and or appliance 129 while the operator is operating vehicle 112. As operation continues over time, the system collects information such as actual mileage, future mileage (planned route information), acceleration rates, deceleration rates, continued sustained or average speeds, rate or frequency of lane changes, proximity data, GPS information (location), and the like. Raw sensor data may include any sensor data that provides useful information that can be entered into an algorithm driven process for developing a unique signature that may conclusively identify the vehicle operator.

Once the vehicle operator has a digital signature developed through continued vehicle operation under analysis, the signature may be associated with that operator for future authentication or identity validation events such as may be required according to the business entity model governing the operation.

In one embodiment, server 120 aided by SW 126 may send a pre-prepared or dynamically generated text message through Internet network 101 via IPR 127 over Internet access line 128, to IPR 108. IPR 108 may route the message through any number of message servers like email or instant message or through a Web message utility on WP 107. The message may then be downloaded or pushed through WISP 110 and over the wireless network to mobile communications appliance 113 or to hardwired or plug-in appliance 129. A copy of the message may be retained for the vehicle operator at the website or at any network-connected instant message application protocol (IMAP) message server.

In this example, the goal of the system is to conclusively identify a vehicle operator by matching current driving patterns of the operator to a digital signature associated with the operator. Messaging discussed above may be limited to messages that might inform a vehicle operator that he or she is operating the wrong vehicle. In another example, the message may confirm that the operator is authorized to continue operating the vehicle or is not authorized to continue operating the vehicle. In one example, there are no messages conveyed to vehicle operators, rather data is simply collected during a period of vehicle operation (week, month, etc.) where the vehicle operator is identified and thus associated with each vehicle driven and time period that the identified operator actually operated the vehicles.

One with skill in the art will appreciate that the types of data that may be taken from mobile appliance 113 are limited only by the sensor capacities on the appliance. It is noted herein that sensors may be internally integrated with mobile telephone 113 and/or may be externally coupled to mobile appliance 113 such as through universal serial bus (USB) plug-in, or other external ports available for the purpose. In active monitoring, satellites may be used to glean location information and direction along routes. Cross-referencing location with mapping system can aid the system in determining the legal speed limits and traffic conditions along a route in a case of insurance cost rating or simple safety enforcement.

In one embodiment, the service of the invention may be provided with any existing network-based navigation service. In one embodiment, the vehicle operator docks the mobile communications appliance into a special hands-free bay while practicing the invention while driving. The system may operate in one example, without the requirement of accessing any hardwired vehicle computer components such as a CPU or ECU and without depending on any hardwired vehicle sensors. In another embodiment, data may be collected from appliance 129 or some other integrated communications appliance in addition to or in place of data collected from a mobile communications appliance.

In one embodiment, a vehicle operator may have some control over what specific data types are revealed to an entity that is monitoring the vehicle use for that individual. In one embodiment, a third-party service provider that has contracts with different companies whose business models require positive vehicle operator identification provides the identification verification service. In one embodiment, the user identification and any specific route location information may be kept private. In an insurance rating model, data forwarded to the insurance company may be cleansed of any information associated with the vehicle or the vehicle operator. In this case, the service may act as a broker in determining if lower insurance premiums can be achieved by sharing pertinent facts of the driving behaviors and record of the user, then forwarding the name of the insurer to the user if the proposed rates might be lower than what the user currently pays. In this case, the vehicle operator must be positively identified.

In one embodiment, a trucking company may obtain the information from the third-party service for all of its authorized users with all driving behavioral data and location or route information associated to the actual vehicle operators. In this case, the company knows which drivers drove what parts of a route including in the case of two drivers sharing the route. A company who allows operators to keep company service vehicles can, using in-route identification procedures to determine if the authorized vehicle operator is operating the vehicle at any given time as opposed to a situation where the vehicle might have been loaned to or otherwise operated by a non-authorized user.

In one embodiment, vehicles equipped to practice the invention may have a warning system installed therein (not illustrated) that might warn of imminent vehicle shut down because the system could not match a vehicle operators monitored data to his or her digital signature kept on file for matching purposes. In this embodiment, a vehicle operator having a digital signature developed from observing driving behavior and habits, operates the vehicle for a period of time sufficient for the system to collect enough operational data to match with the signature kept on file for that operator. If the system finds the operator not authorized to operate the vehicle, the warning might be triggered giving the operator a voice message telling the operator that the vehicle will shut down momentarily and to pull over to avoid any accident.

In another embodiment, there may be no messaging or warnings, but authorized and non-authorized vehicle use may be recorded for later use by a governing entity to implement policy or to better manage a mobile workforce, etc. Insurance companies may use the system's identification verification capabilities to determine who was actually driving a vehicle when an accident occurred. Law enforcement might tap into the system as well to determine an identification for an unknown driver who carjacked or stole a vehicle.

Of course such identification would depend on a fact that the thief had, at one time, been identified in the system as a vehicle operator with a digital driving signature identifying that driver and that the stolen vehicle was equipped to practice the invention using a hardwired or integrated communications appliance capable of reporting collected information to the system. Likewise, the thief must drive the stolen vehicle for a sufficient amount of time for a conclusive match to occur.

In one embodiment, a vehicle operator having a driving behavioral signature on file may operate a friend's car after receiving permission from the friend. After a relatively short driving period, the system may verify that the owner (identifiable by signature is not the driver) and may further identify the new driver by matching the driving data collected to a digital signature on file for the new driver. In the future, that vehicle may be added to a list of vehicles that the operator has permission or has had permission to drive in the past.

It is important to note herein that different vehicles having differing physical driving characteristics may not produce exact driving or performance data statistics when driven by a same individual or different individuals. Therefore, to develop a digital signature for a vehicle operator that can be matched to driving behavior, data must be chosen that will remain fairly consistent for that vehicle operator across a range of vehicles the operator may be eventually authorized to operate. In this regard, there may be more than one vehicle operator identifying digital signature created for one vehicle operator. For example, a vehicle operator may be authorized to drive company vehicles like one or more fleet vehicles where such vehicles exhibit substantial similarity such as similar size, wheelbase, and transmission system.

The same vehicle operator may also be authorized to operate company-owned heavy equipment including eighteen-wheeler transport trucks, pay loaders, and other heavy vehicle types. In such examples, the operator may have one digital signature for validation to operate the fleet vehicles and another completely different digital driving signature for operating the heavy equipment. The important goal of the invention is that matching driving behaviors to the digital signatures developed in the same fashion using the same or similar type vehicles can identify that operator and differentiate that operator from other operators having or not having driving signatures that authorize them to operate the same vehicles or equipment. However, it will be appreciated that a vehicle operator that is authorized to operate disparate vehicle types such as a passenger car and a bus may have two different operation identification signatures, one for the bus and one for the car.

Figure 2:
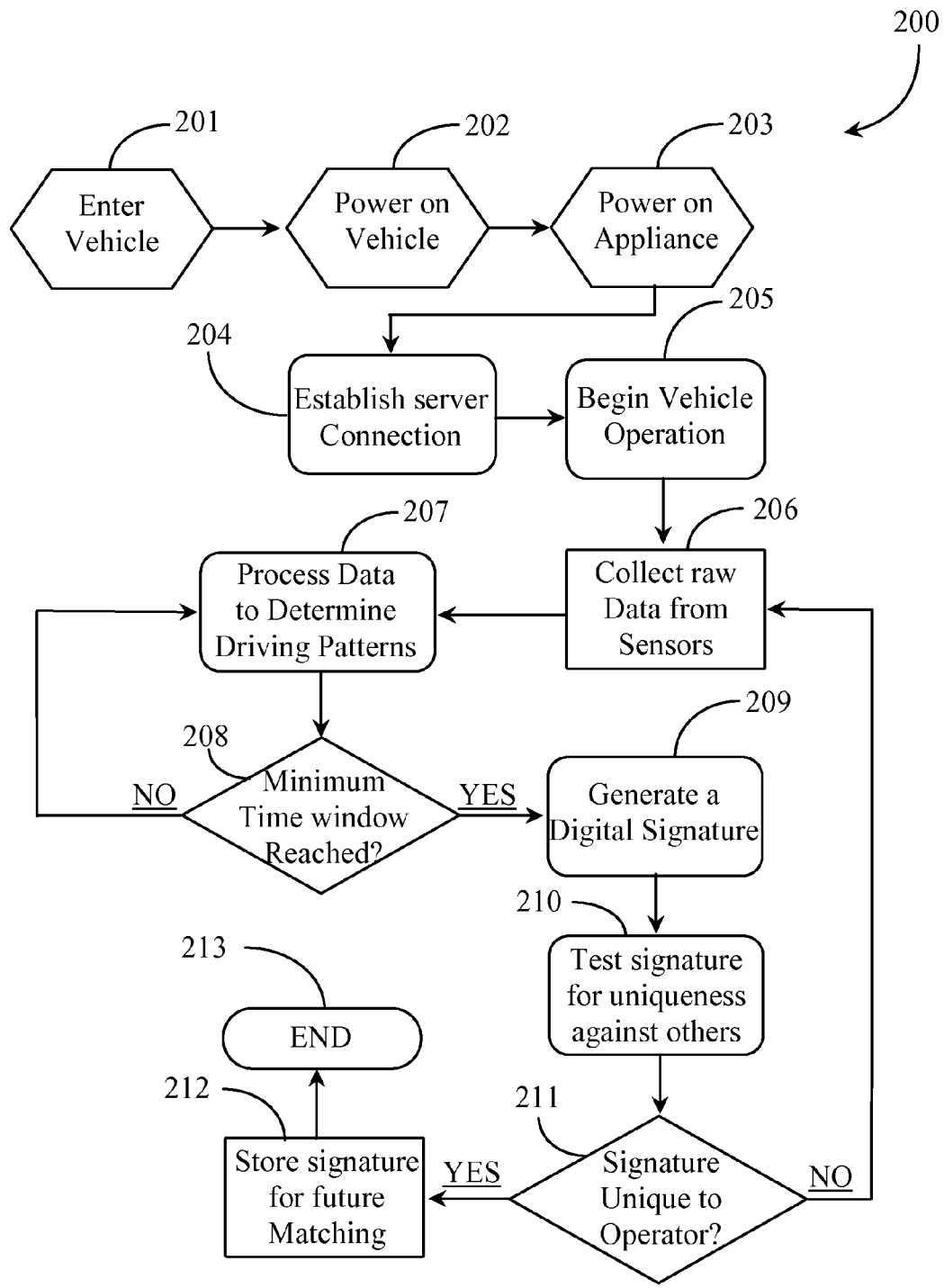
FIG. 2 is a process flow chart depicting steps for developing a digital signature for a vehicle operator in an embodiment of the invention.

FIG. 2 is a process flow chart 200 depicting steps for developing a digital signature for a vehicle operator according to the embodiment of FIG. 1. In this example, it is assumed that the vehicle operator is registered to use the service of the present invention such as having registered through a website like web page 107 of FIG. 1.

At step 201, a vehicle operator that is already known to the operator verification system enters a vehicle such as vehicle 112 of FIG. 1. In this step, authentication such as entering a pass code or personal identification number into the system might be a requirement. In step 202 the vehicle operator powers on the vehicle, if not already running. At step 203, the vehicle operator may power on a personal mobile communications appliance adapted to practice the invention, if it is not already powered on. At step 204, the vehicle operator or some automated control function establishes a server connection with an activity-monitoring server such as server 120 of FIG. 1.

At step 205, the vehicle operator begins operating the vehicle. If operation of the vehicle includes driving or navigating a pre-planned route, this route information may be forwarded to the server for reference. When the vehicle operator is connected to the monitoring server and driving the vehicle, the operator is considered online. In one embodiment, the mobile communications appliance is docked in a docking station or bay.

At step 206, the system collects raw data from sensors on the mobile communications appliance. In one embodiment, the raw data is collected from a hardwired appliance such as processor 129. In one embodiment, network connection is intermittent so the raw data collected for a period of time may be stored temporarily before uploading the data to a server for processing. Collection of raw data may be continuous during operation of the vehicle, or it may be performed periodically during a period of vehicle operation.

The types of raw data that may be collected can vary widely and are limited only by the capability of and instant availability of a sensor to detect and report the data type. Typical driving behavioral data that may be collected include acceleration data, deceleration data, continued average driving speed, break activation data, clutch or shifter position data, steering data, clutch activation data (if clutch operated vehicle), centrifugal force (speed while turning), time of stop (stop sign) or other types of driving behavioral data derived from operations that might be repeated frequently during vehicle operation.

At step 207, the system processes raw data collected in step 206 to determine driving behavioral patterns. A behavioral pattern may consist of a sequence of incidents or events that can be quantified in terms of frequency of the event over time and by event attributes or characteristics for each single event that may be different for each event but that may be averaged to determine the mean characteristic or attribute for that vehicle operator for that event type. In one embodiment, step 207 may be practiced on one or more predetermined categories of driving data in parallel.

At step 208, the system may determine if a minimum time window has been reached for data collection and processing. Step 208 is not absolutely required in order to practice the present invention. However, putting a time frame on data collection and processing helps to constrain the process and to promote efficiency in the process. The system will likely require a minimum amount of "training" time to produce a unique data signature for a vehicle operator. Moreover there may be several driving behavioral data categories that are predetermined to be part of such as signature.

At step 208, if the minimum time window has not yet been reached, the process may resolve back to step 207 for continued data processing. If a minimum time window for collecting and processing data has been reached at step 208, then the system may generate a digital driving behavioral signature at step 209 for that vehicle operator. In one embodiment, there may be driving behavior suggestions put forth in instruction by the system such as driving a predetermined course containing starts, stops, turn, accelerations, decelerations, obstacle interventions and response gauging, among other testing methods. In another embodiment the vehicle operator simply takes a "test" drive through a suggested driving area, where the time of driving lasts longer than the predetermined minimum time window of step 208.

Once the driving behavioral signature is generated for the vehicle operator at step 209, the system may test the signature for uniqueness against any other prepared signatures known to the system at step 210. Since driving behavior is used to generate the unique signature, it is expected that analysis of future driving behavior of the same vehicle operator will result in matching the operator to the stored driving behavioral signature developed for the operator in this process. The system may simply compare the generated signature to all of the stored signatures for other vehicle operators for whom signatures have been developed.

At step 211, the system determines if the generated driving behavioral signature is unique to the vehicle operator for which it was generated. If the signature is not unique to the vehicle operator for which it was generated at step 211, then the process resolves back to step 206 where the process may be repeated. In one embodiment, several categories of driving behavior may be predetermined for analysis and signature generation. In such a case, only the predetermined categories are considered for each vehicle operator.

Each category of data should present with numerous repeatable and, in preferred cases measurable events. For example, a predetermined driving behavioral category might be breaking style (application pattern of breaking) The data for this category might include the counted number of breaking events that occurred during the minimum time window and the measured force applied to the breaks during each event. Breaks may also be applied at certain times in addition to stopping such as when traveling down a slope and when traveling into a turn. A digital signature could be generated that only included "Breaking Style". However, in a preferred embodiment several driving behavioral categories may be considered for generating a single unique digital signature.

If the driving behavioral signature is unique to the vehicle operator at step 211, then the process moves to step 212 and the digital signature is stored for future matching. In one embodiment the digital signature is a concatenated string of several values that were each derived from a separate category of driving behavior. After the signature is stored for that vehicle operator at step 212, the process ends for that operator at step 213. The next time that the operator uses one of the approved vehicles, the vehicle operator may be identified by the system based on observation of the operator's driving behavior. A process for identifying an unknown vehicle operator via matching the operator's driving behavior to a driving behavioral signature in storage is described later in this specification.

It should be noted herein that other data types aside from strict vehicle operation data could be incorporated into a process for developing a digital signature without departing from the spirit and scope of the present invention, for example, when the vehicle operator enters a vehicle for "signature training".

The mirror and seating adjusted positions could be recorded. There may be a sensor provided in the driver's seat that may calculate operator's weight. There may be a sensor installed in the vehicle dashboard that may calculate the height of the operator in the seat. This rather static data could be added to the signature data to promote uniqueness and help with identification of operators.

If feedback is provided to a vehicle operator during signature development training, the feedback could be provided through an application running on the mobile communications appliance or the hardware appliance if there is a human interface to the hardware. In one embodiment, the feedback could be pulled by the vehicle operator or pushed by the server. The feedback can also be presented to the user through an alternative interface like a web browser on a desktop computer, laptop, or on a mobile device. The alternative interface or mobile device may also be used to control which information elements are shared with third parties like insurance companies. In this way, users may protect their privacy.

Figure 3:
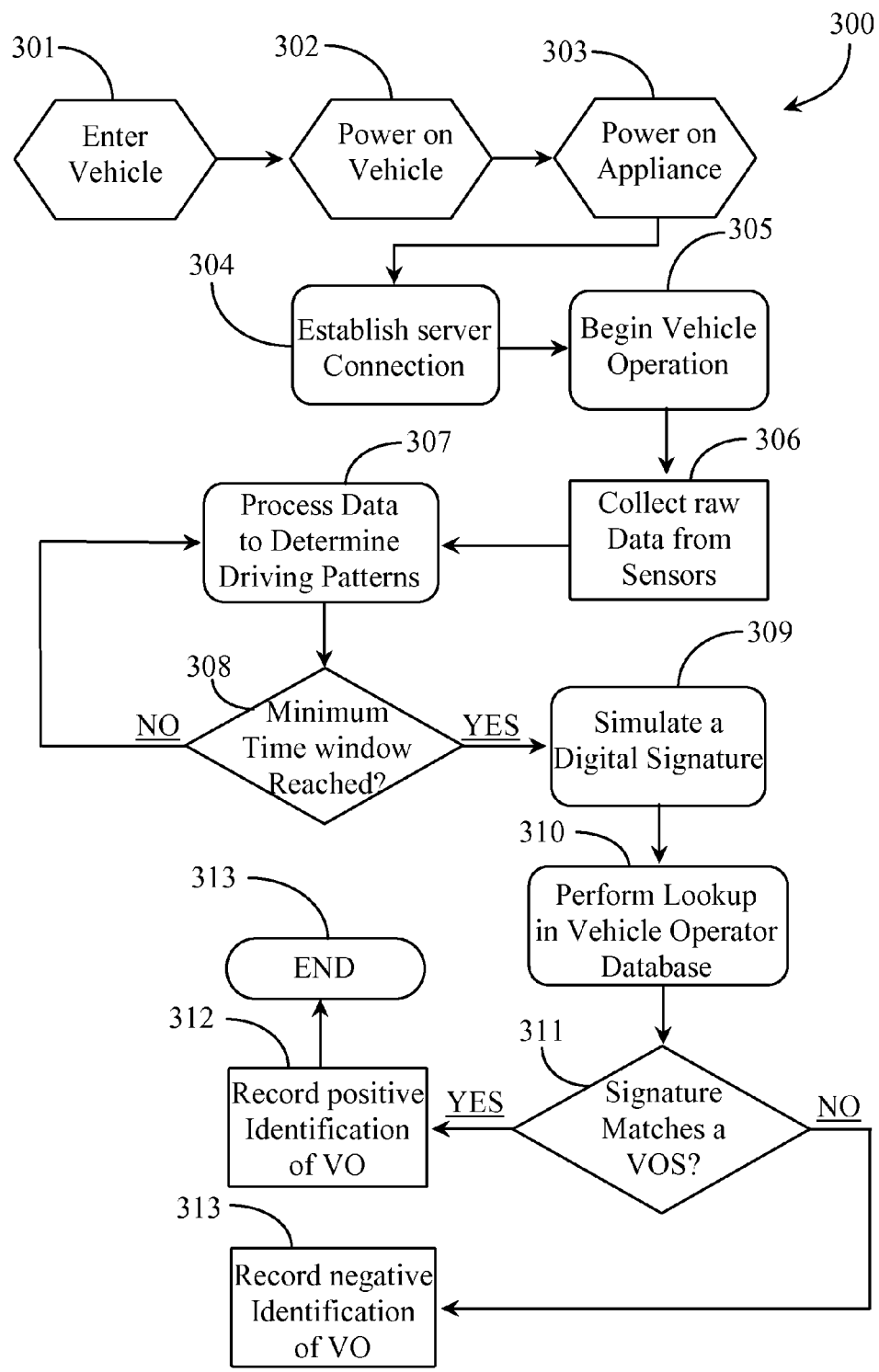
FIG. 3 is a process flow chart depicting steps for processing collected data to determine if a current vehicle operator is authorized to operate the vehicle in an embodiment of the invention.

FIG. 3 is a process flow chart 300 depicting steps for processing collected data to determine if a current vehicle operator is authorized to operate the vehicle according to the embodiment of FIG. 1. This process is somewhat similar in nature to the process of FIG. 2 above. In this regard steps 301 through 308 are identical in nature to steps 201 through 208 of FIG. 2 accept for the fact that the vehicle operator is not yet known to the system. At step 308, the system determines if a minimum time window of continued data collection and data processing has been reached. If the minimum time for data collection and processing has not been reached then the process resolves back to step 307 for continued processing.

If the minimum time window for data collection and processing is at hand in step 308, then the system may simulate (temporarily form) a digital signature of the vehicle operator's driving behavior for use in matching at step 309. It is important to note herein that the rules relative to signature training and signature matching are standardized to a point that ensures the driving behavioral data categories for which data is collected and analyzed are the same or identical for both processes. The system performs a lookup operation in a vehicle operator database such as VOD 125 of FIG. 1 at step 310 using the simulated digital signature as search criteria.

At step 311, the system determines if the simulated signature matches a vehicle operator's signature (VOS) stored in the database. If there is a positive match at step 311, then the system records the positive identification of the vehicle operator at step 312. The process then ends for that vehicle operator at step 313. If the system is unable to match the simulated signature to a stored signature at step 311, the process moves to step 314 where the system records a negative or "failed" identification of the vehicle operator. The process may then end for that vehicle operator at step 313.

In cases where the system can match the driving behavior of the operator to a digital signature identifying the operator, the information can be used in a variety of ways by a wide range of entities. The knowledge of who is operating the vehicle at the time is the gold standard. In the case that the system cannot match the digital signature, it would be an indication that the vehicle operator is not currently authorized to operate the vehicle in question. Such information may be used differently by different entities as previously described.

In one aspect of the present invention, a third-party service provider hosts data collection, processing, signature development, and signature matching in the field. The processed data may then be shared with the appropriate entity for the benefit of that entity to be able to determine which individuals were operating which vehicles at which times in the field. In another aspect of the invention, data collection, processing, signature development, and signature matching are performed by the entity that requires the information. In this aspect, the entity may practice the invention, such practice enabled through purchase and installation of the software of the invention with full authorization and license after purchasing a non-transitory physical medium containing the executable program(s).

Figure 4:
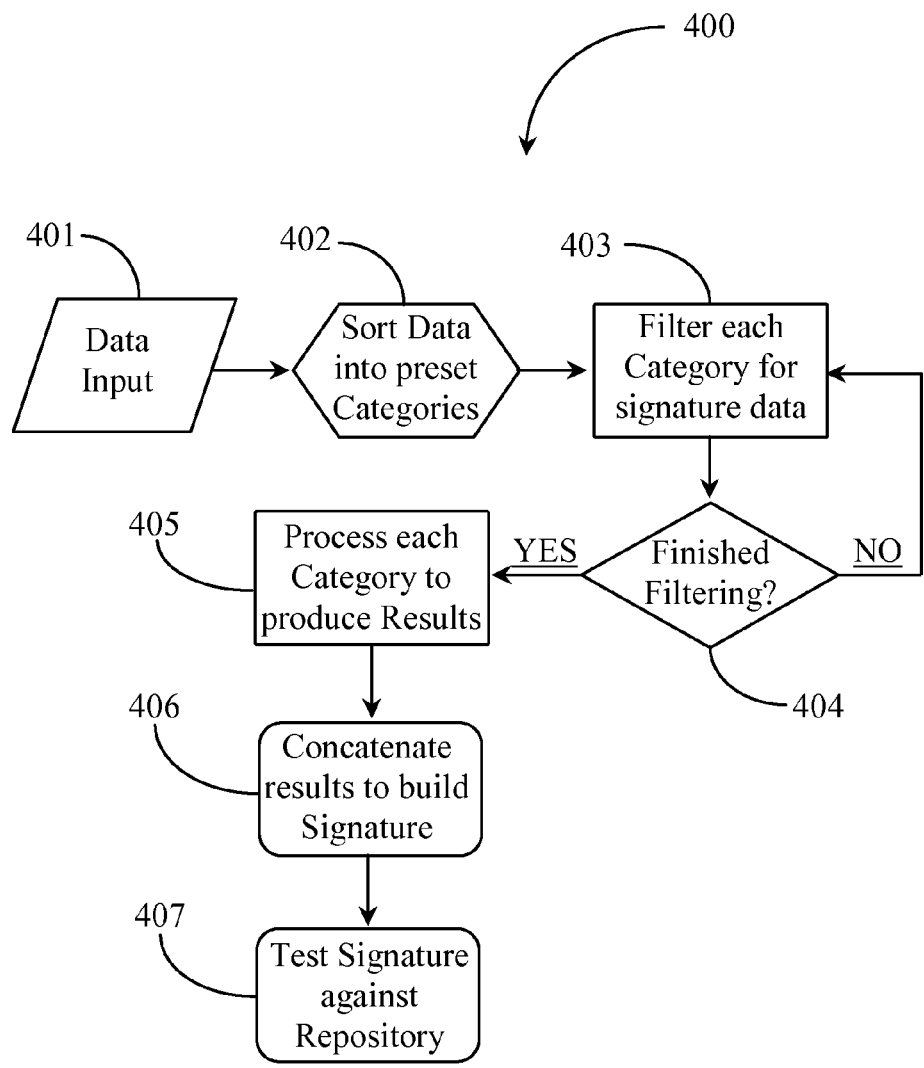
FIG. 4 is a process flow chart depicting steps for constructing a useful driving behavioral signature according to an embodiment of the present invention.

FIG. 4 is a process flow chart 400 depicting steps for constructing a useful driving behavioral signature according to an embodiment of the present invention. This process is exemplary and represents just one method that can be applied to produce a digital signature that exhibits the integrity required for practical user identification and that might be reliably reproduced in the field for identity matching.

At step 401, the processing system receives the data collected during vehicle operation. In this case, the data may be streamed into the processing system in real time or near-to-real time. In one embodiment, the data may be collected by a mobile or docked communications appliance or by a hard-wired CPU type component serving as the computing brain of the vehicle.

At step 402, the processing system sorts the data into preset categories. The exact data categories may differ per design application, however each chosen data category will represent a type of driving behavior that is generally highly repeated during the course of driving thereby providing sufficient data in each category for processing, normalization, averaging, and so on. In one embodiment, each category of data is separately communicated to the processing unit. In this case sorting between present categories may be unnecessary. Selection of more than one or two categories may provide more robust data for analysis and may provide some assurance that no pair of operators will exhibit the same patterns across all of the categories, which might lead to a same or highly similar digital signature and that repeat analysis of a same operator may produce substantially the same digital signature using the same development process and data categories.

At step 403, each of the categories of data is filtered for signature data. Signature data may be expressed as a machine-readable value for each category. Signature data may include recognized patterns or sequences of events, for example, the number of times the brakes were applied within a given driving period or the number of lane changes that occurred during the period. Signature data may include measured data such as what measure of force was recorded with each brake application. Another example of a data category might be velocity including acceleration events, deceleration events, and sustained speeds. Filtering data may include averaging, normalizing, disregarding extreme numbers or measurements, retaining peaks, retaining lows, and so on. Filtered data for each category is ready for data processing.

At step 404, the system determines if it is finished filtering data. If the system is not finished filtering data at step 404, the process resolves back to step 403. When the system is finished filtering the data for signature data for each category, the process moves to step 405. At step 405, the processing component processes the signature data in each category to produce signature results for each category. Processing may include value hashing, algorithmic processing, mathematical equating, including introduction of constants or variables, and so on. Different categories may require different processes to produce desired results.

At step 406, the system may concatenate the results for each category produced at step 405 into a unique signature string that is machine-readable and can be stored in a digital format for database lookup. At step 407, the system may test the concatenated signature against other stored signatures to ensure that it is unique to the vehicle operator. In one embodiment, the system may repeat process 400 with the same operator in near-to-real-time to determine if the signature is sufficiently reproducible. A heuristic method can be used to match a simulated signature, which is a temporary signature developed by analyzing real time driving behavior of an unknown vehicle operator, to a cache of developed signatures identifying known drivers. In a preferred embodiment, a margin of error in matching a simulated signature with a stored signature should be held less than the mean difference between the stored signatures.

It will be apparent to one with skill in the art that a driving behavioral data signature could be reduced to a string of binary values, characters, symbols, or other indicia without departing from the spirit and scope of the present invention. It will also be apparent that data used to generate signature data by the process is not limited entirely to driving behavioral data as variables, measured values, constant values, and certain other known values might be incorporated in the process to help refine differentiation of signatures of multiple vehicle operators while ensuring that each of those operators have extremely high repeatability in reproduction of subsequent signatures for identification purposes.

It will be apparent to one with skill in the art that the identification verification system of the invention may be provided using some or all of the mentioned features and components without departing from the spirit and scope of the present invention. It will also be apparent to the skilled artisan that the embodiments described above are specific examples of a single broader invention that may have greater scope than any of the singular descriptions taught. There may be many alterations made in the descriptions without departing from the spirit and scope of the present invention.

What is claimed is:

1. A system comprising:
   a computerized appliance; and
   software executing from a non-transitory medium on the computerized appliance and providing:
   collecting raw data regarding vehicle operation from sensors implemented in the vehicle during real-time operation by a specific person, the raw data comprising at least acceleration, deceleration, continued average speed, centrifugal force, braking patterns, gearshift manipulation patterns, frequency of lane changes, adjusted seat position, and adjusted mirror position;

associating the collected data to pre-programmed event categories;

developing a signature value for individual ones of the categories based on at least filtering and processing the collected data in each category, the signature values expressed as digital strings;

concatenating the digital strings from each category into a single digital string as a digital signature for the specific person; and testing the digital signature for the specific person against other digital signatures stored for other persons to determine that the digital signature is indeed unique.

2. The system of claim 1 wherein the computerized appliance communicates with a network-connected server, communicates data to the server, and the server provides at least a part of the development of the digital signature.

3. The system of claim 2, wherein the processing includes at least value hashing, algorithmic processing, mathematical equating, including introduction of constants or variables to create the signature values.

4. The system of claim 1, wherein the raw data comprises weather conditions, vehicle and operator combined weight, and traffic conditions during vehicle operation.

5. The system of claim 1, wherein the computerized appliance is one of a cellular telephone, a personal digital assistant (PDA), an in-dash telephone, or notebook computer enhanced for telephony.

6. The system of claim 1 wherein the computerized appliance is a wireless modem-assisted reporting module having electronic access to car diagnostics systems through a fixed engine control unit (ECU).

7. The system of claim 1, wherein the digital signatures are developed for more than one specific person associated with a single vehicle, the digital signatures used during vehicle operation to identify which one of multiple persons associated with the single vehicle operators is currently operating the vehicle.

8. A method comprising the steps of:
(a) collecting, by a computerized appliance from sensors implemented in the vehicle, and during operation by a specific person, raw data regarding vehicle operation, the raw data comprising at least acceleration, deceleration, continued average speed, centrifugal force, braking patterns, gearshift manipulation patterns, frequency of lane changes, adjusted seat position, and adjusted mirror position;
(b) associating the collected data to pre-programmed event categories;
(c) developing a signature value for individual ones of the event categories based on at least filtering and processing the collected data in each category, the signature values expressed as machine-readable digital strings; and
(d) concatenating the digital strings from each category into a single digital string as a digital signature for the specific person; and
testing the digital signature for the specific person against other digital signatures stored for other persons to determine that the digital signature is indeed unique.

9. The method of claim 8 wherein the computerized appliance communicates with a network-connected server, communicates data to the server, and the server provides at least a part of the development of the digital signature.

10. The method of claim 9, wherein the processing includes at least value hashing, algorithmic processing, mathematical equating, including introduction of constants or variables to create the signature values.

11. The system of claim 8, wherein the raw data comprises weather conditions, vehicle and operator combined weight, and traffic conditions during vehicle operation.

12. The method of claim 8, wherein the computerized appliance is one of a cellular telephone, a personal digital assistant (PDA), an in-dash telephone, or a notebook computer enhanced for telephony.

13. The method of claim 8 wherein the computerized appliance is a wireless modem-assisted reporting module having electronic access to car diagnostics systems through a fixed engine control unit (ECU).

14. The system of claim 8, wherein the digital signatures are developed for more than one specific person associated with a single vehicle, the digital signatures used during vehicle operation to identify which one of multiple persons associated with the single vehicle operators is currently operating the vehicle.

* * * * *